(12) United States Patent
Yonekubo et al.

(10) Patent No.: US 11,947,124 B2
(45) Date of Patent: Apr. 2, 2024

(54) DISPLAY DEVICE AND METHOD OF ADJUSTING OPTICAL SYSTEM OF DISPLAY DEVICE

(71) Applicant: SEIKO EPSON CORPORATION, Tokyo (JP)

(72) Inventors: Masatoshi Yonekubo, Nagano-ken (JP); Masafumi Sakaguchi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 306 days.

(21) Appl. No.: 17/004,005

(22) Filed: Aug. 27, 2020

(65) Prior Publication Data

US 2021/0063756 A1    Mar. 4, 2021

(30) Foreign Application Priority Data

Aug. 29, 2019 (JP) ................................. 2019-156643

(51) Int. Cl.
*G02B 27/42* (2006.01)
*G02B 27/01* (2006.01)

(52) U.S. Cl.
CPC ..... *G02B 27/0176* (2013.01); *G02B 27/0172* (2013.01); *G02B 27/4211* (2013.01); *G02B 2027/011* (2013.01); *G02B 2027/0154* (2013.01); *G02B 2027/0178* (2013.01)

(58) Field of Classification Search
CPC ............ G02B 27/0176; G02B 27/0172; G02B 27/4211; G02B 2027/011
USPC ......................................................... 359/558
See application file for complete search history.

(56) References Cited

U.S. PATENT DOCUMENTS

| | | | |
|---|---|---|---|
| 2007/0279744 A1* | 12/2007 | Fujimoto | G02B 27/0172 359/557 |
| 2007/0291355 A1* | 12/2007 | Tanijiri | G02B 27/0172 359/467 |
| 2017/0010465 A1* | 1/2017 | Martinez | G02B 27/017 |
| 2017/0010471 A1* | 1/2017 | Serrano Canovas | ........................ H04N 13/117 |
| 2017/0199442 A1* | 7/2017 | Kim | G02B 26/0875 |
| 2020/0088932 A1* | 3/2020 | Schultz | G02B 6/006 |
| 2020/0341283 A1* | 10/2020 | McCracken | G02B 27/0172 |

FOREIGN PATENT DOCUMENTS

| | | |
|---|---|---|
| JP | 2001209001 | 8/2001 |
| JP | 2007328021 | 12/2007 |
| JP | 2014122941 | 7/2014 |
| JP | 2016180937 | 10/2016 |

* cited by examiner

*Primary Examiner* — Jonathan M Blancha
(74) *Attorney, Agent, or Firm* — JCIPRNET

(57) ABSTRACT

A display device of the present disclosure includes an optical system, the optical system including an image light generation device configured to generate image light, a projection optical system including an optical element, the optical element including an optical surface asymmetric in a direction along at least a first axis of two axes orthogonal to each other and perpendicular to an optical axis of the image light, a support member configured to support the optical element, a first adjustment mechanism configured to adjust a position of the optical element in the direction along the first axis, and a second adjustment mechanism configured to adjust a position of an emission region of the image light in the direction along the first axis.

11 Claims, 11 Drawing Sheets

DISPLAY DEVICE AND METHOD OF ADJUSTING OPTICAL SYSTEM OF DISPLAY DEVICE

The present application is based on, and claims priority from JP Application Serial Number 2019-156643, filed Aug. 29, 2019, the disclosure of which is hereby incorporated by reference herein in its entirety.

BACKGROUND

1. Technical Field

The present disclosure relates to a display device and a method of adjusting an optical system of the display device.

2. Related Art

JP-A-2007-328021 discloses an image display device including an image display element configured to display an image, a first optical system configured to perform enlarged formation of an image that is displayed on the image display element, and a second optical system configured to guide light from the first optical system to an observer in an enlarged manner, wherein the second optical system includes an eccentric reflection surface, and an adjustment mechanism configured to displace at least a part of the optical member constituting the first optical system so as to provide a directional component perpendicular to the optical axis is provided.

JP-A-2007-328021 discloses that eccentric aberrations such as astigmatism and coma aberration can be adjusted by shifting an anamorphic lens in the first optical system in a direction perpendicular to the optical axis. With the adjustment method described above, the resolution of the image is improved; however, the position of the image in the observer's field of view is shifted from a desired position, and consequently unpleasantness may be given to the observer. In addition, when binocular vision is performed with a head-mounted display provided with the above-described optical system, the positions of the images do not match between the left and right eyes, and consequently unpleasantness may be given to the observer.

SUMMARY

In order to solve the problems described above, a display device according to one aspect of the present disclosure includes an optical system, the optical system including an image light generation device configured to generate image light, a projection optical system including an optical element, the optical element including an optical surface asymmetric in a direction along at least a first axis of two axes orthogonal to each other and perpendicular to an optical axis of the image light, a support member configured to support the optical element, a first adjustment mechanism configured to adjust a position of the optical element in the direction along the first axis, and a second adjustment mechanism configured to adjust a position of an emission region of the image light in the direction along the first axis.

In the present specification, the first adjustment mechanism is a concept that includes a mechanism that can adjust the position of the optical element after completion of the display device, and a mechanism that can adjust the position of the optical element in the manufacturing process of the display device, but after completion of the display device, cannot adjust the position because of the fixed optical element while leaving a trace of the positional adjustment of the optical element. Likewise, the second adjustment mechanism is a concept that includes a mechanism that can adjust the position of the emission region of the image light after completion of the display device, and a mechanism that can adjust the position of the emission region of the image light in the manufacturing process of the display device, but after completion of the display device, cannot adjust the position of the emission region of the image light while leaving a trace of the positional adjustment of the emission region of the image light.

In the display device according to one aspect of the present disclosure, the second adjustment mechanism may include a device position adjustment mechanism configured to adjust a relative position of the image light generation device with respect to the optical element.

In the display device according to one aspect of the present disclosure, the second adjustment mechanism may include an emission position adjustment circuit configured to adjust a position of an image light emission region in an image light emittable region in the image light generation device.

A display device according to one aspect of the present disclosure includes an optical system, the optical system including an image light generation device configured to generate image light, a projection optical system including an optical element including an optical surface asymmetric in a direction along at least a first axis of two axes orthogonal to each other and perpendicular to an optical axis of the image light, and including a reflection element on which the image light emitted from the optical element is incident, a first adjustment mechanism configured to adjust a position of the optical element in the direction along the first axis, and a second adjustment mechanism configured to adjust a traveling direction of the image light by turning the reflection element about a rotation axis parallel to an axis that intersects the optical axis.

In the display device according to one aspect of the present disclosure, the first adjustment mechanism may include an optical element position adjustment mechanism configured to adjust a relative position of the optical element with respect to the support member.

In the display device according to one aspect of the present disclosure, the optical element position adjustment mechanism may include a spacer provided between the optical element and the support member.

In the display device according to one aspect of the present disclosure, the optical element position adjustment mechanism may include a pressing member configured to move the optical element through the support member.

In the display device according to one aspect of the present disclosure, the optical system may further include a first diffraction element configured to guide the image light to an eye of an observer, and a chromatic aberration correction element configured to correct a chromatic aberration generated at the first diffraction element.

In the display device according to one aspect of the present disclosure, the chromatic aberration correction element may be a second diffraction element configured to guide the image light to the first diffraction element.

In the display device according to one aspect of the present disclosure, at least a portion of the second diffraction element may be disposed inside the support member.

In the display device according to one aspect of the present disclosure, a pair of the optical systems may be provided, and the pair of the optical systems may be constituted of a right-eye optical system configured to guide the image light to a right eye of an observer, and a left-eye optical system configured to guide the image light to a left eye of the observer.

In a method of adjusting an optical system of a display device according to one aspect of the present disclosure, the optical system includes an image light generation device configured to generate image light, a projection optical system including an optical element, the optical element including an optical surface asymmetric in a direction along at least a first axis of two axes orthogonal to each other and perpendicular to an optical axis of the image light, and a support member configured to support the optical element, the method including a first adjusting step of adjusting a position of the optical element in the direction along the first axis, and a second adjusting step of adjusting, after the first adjusting step, a position of an emission region of the image light in the direction along the first axis.

In a method of adjusting an optical system of a display device according to one aspect of the present disclosure, the optical system includes an image light generation device configured to generate image light, and a projection optical system including an optical element including an optical surface asymmetric in a direction along at least a first axis of two axes orthogonal to each other and perpendicular to an optical axis of the image light, and including a reflection element on which the image light emitted from the optical element is incident, the method including a first adjusting step of adjusting a position of the optical element in the direction along the first axis, and a second adjusting step of adjusting, after the first adjusting step, a traveling direction of the image light by turning the reflection element about a rotation axis parallel to an axis that intersects the optical axis.

DESCRIPTION OF EXEMPLARY EMBODIMENTS

First Embodiment

A first embodiment of the present disclosure is described below with reference to FIGS. 1 to 7.

Figure 1:
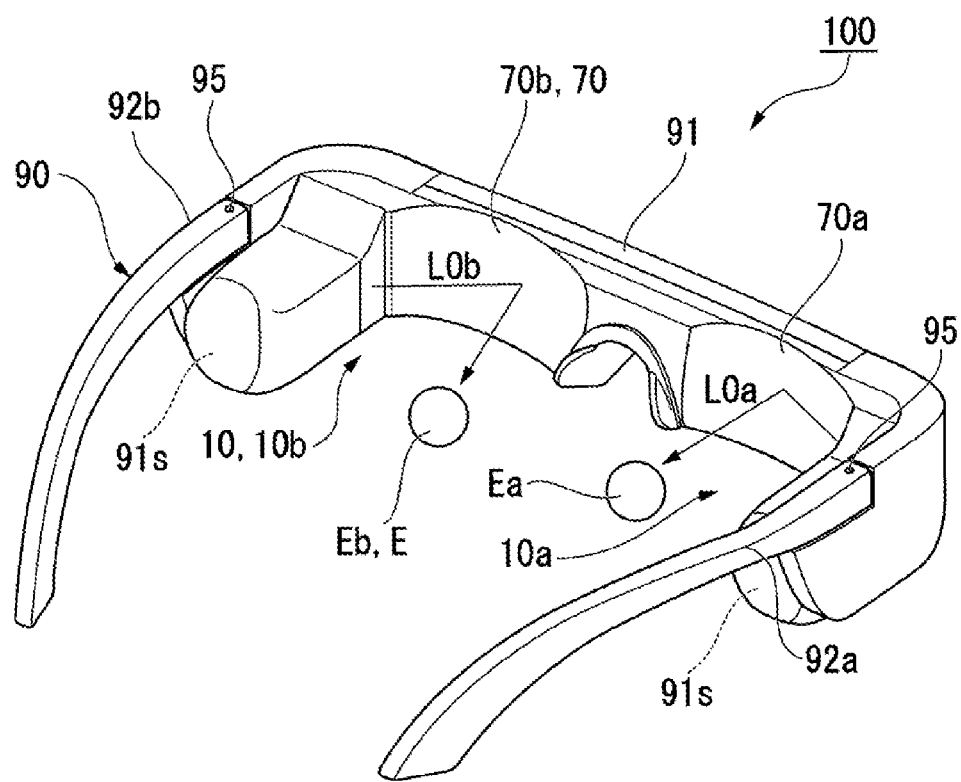
FIG. 1 is a perspective view illustrating an appearance of a display device.
Figure 2:
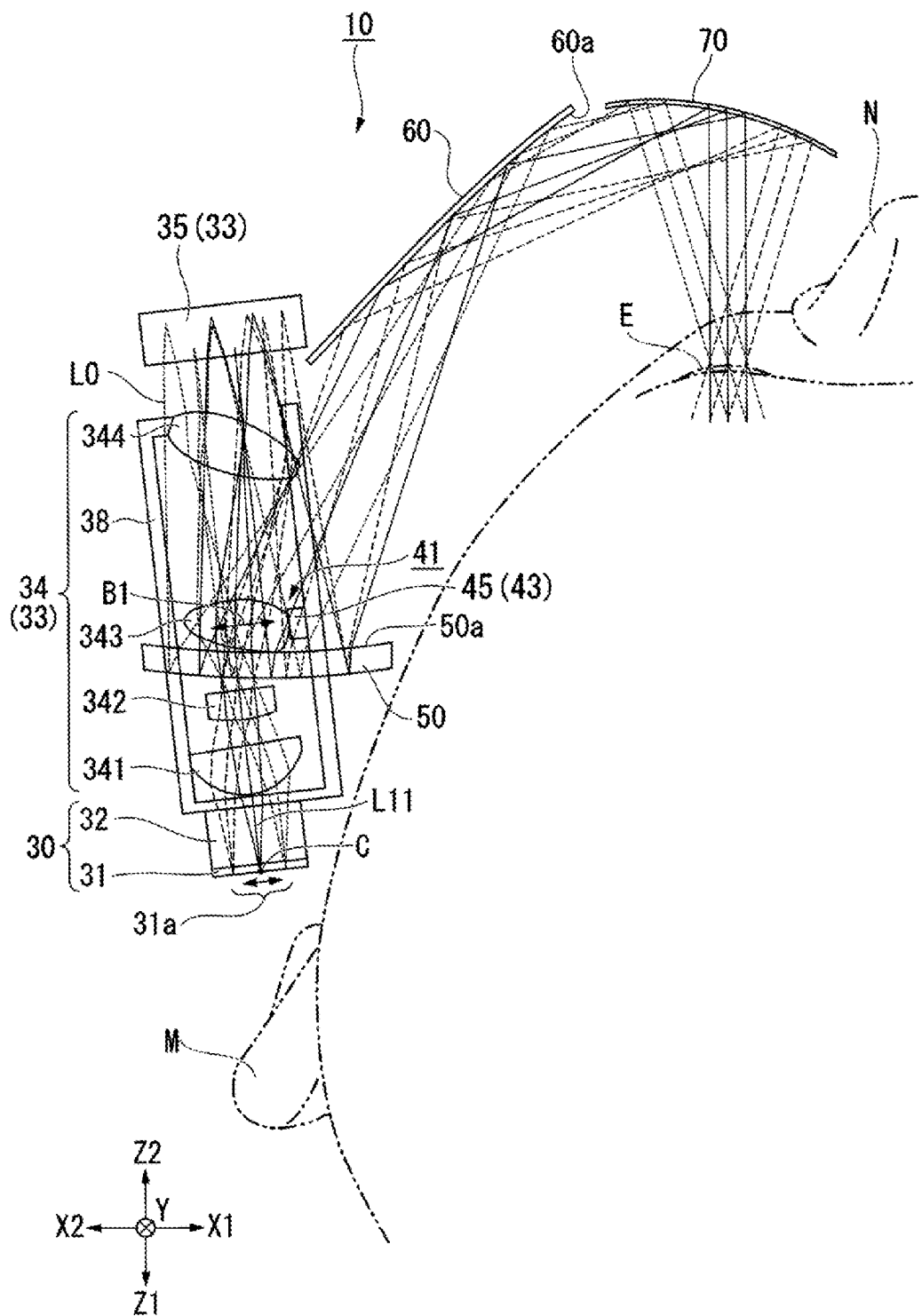
FIG. 2 is a top view illustrating a schematic configuration of an optical system of a display device of a first embodiment.
Figure 3:
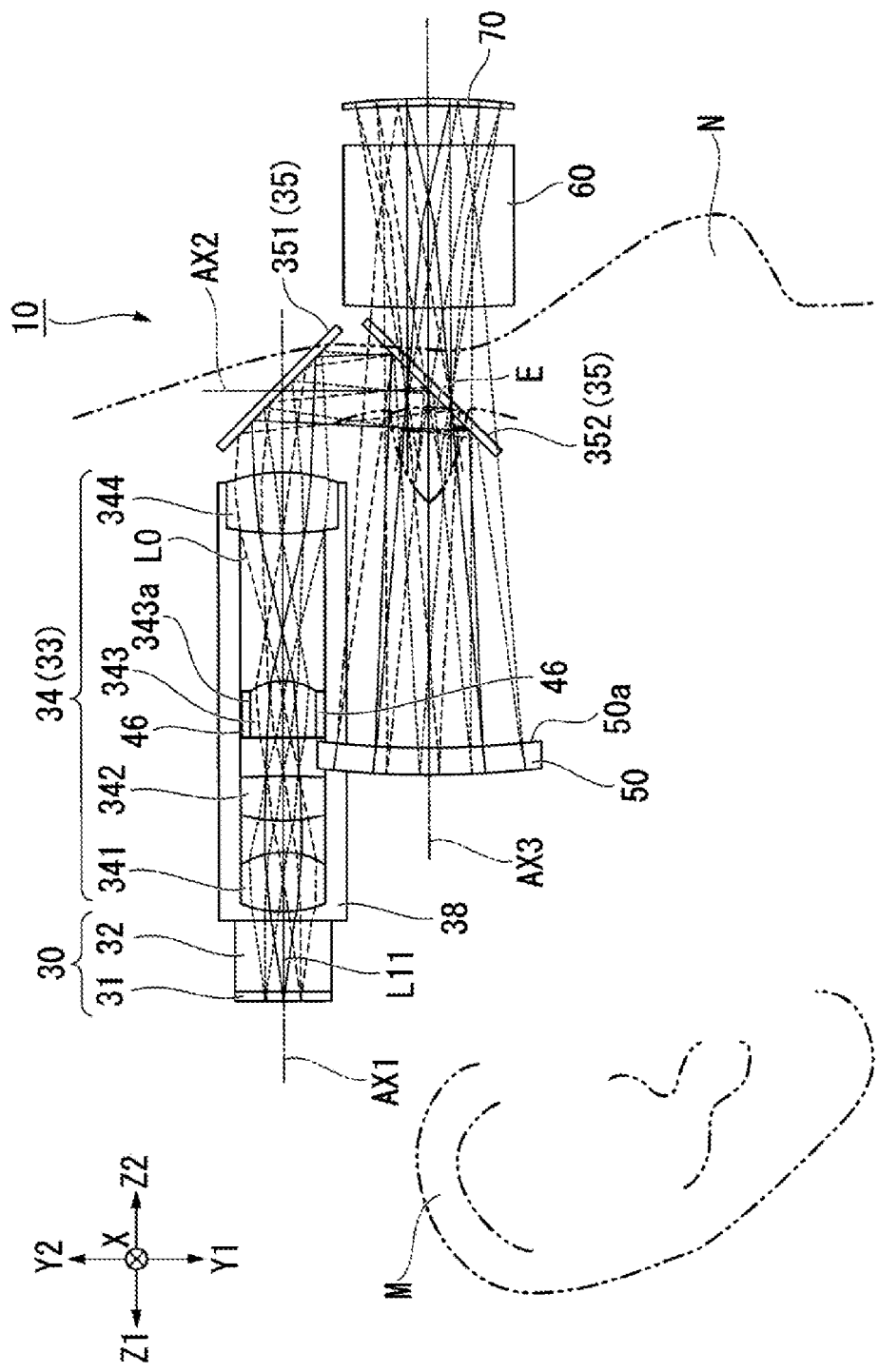
FIG. 3 is a side view illustrating a schematic configuration of the optical system of the display device.

FIG. 1 is a perspective view illustrating an appearance of a head-wearable display device. FIG. 2 is a top view illustrating a configuration of an optical system in the head-wearable display device. FIG. 3 is a side view of the optical system of the head-wearable display device.

In the following description, the head-wearable display device (head-mounted display) is simply referred to as a display device. In addition, in the drawings, the components may not be drawn to scale for clarity of illustration of the components.

In the drawings, the following directions are defined using the front-rear direction, the left-right direction, and the up-down direction in the state where the user wears a display device 100 on his or her head. The up-down direction is referred to as a first direction Y, the direction from top to bottom is referred to as one direction Y1 of the first direction Y, and the direction from bottom to top is referred to as the other direction Y2 of the first direction Y. The front-rear direction is referred to as a second direction Z, the direction from front to rear is referred to as one direction Z1 of the second direction Z, and the direction from rear to front is referred to as the other direction Z2 of the second direction Z. The left-right direction is referred to as a third direction X, the direction from left to right is referred to as one direction X1 of the third direction X, and the direction from right to left is referred to as the other direction X2 of the third direction X. The first direction Y, the second direction Z, and the third direction X intersect each other.

In addition, when the above-described directions are defined using the components of the display device 100, the direction in which a second diffraction element 70a of a right-eye optical system 10a and a second diffraction element 70b of a left-eye optical system 10b are aligned is referred to as the third direction X, the direction from the second diffraction element 70b toward the second diffraction element 70a is referred to as X1, and the direction from the second diffraction element 70a toward the second diffraction element 70b is referred to as X2. In an optical system 10 described later, the direction in which a first deflection part 351 and a second deflection part 352 are aligned is referred to as the first direction Y. One direction thereof is referred to as Y1 and the other direction thereof is referred to as Y2. The direction in which an image light generation device 30 and the first deflection part 351 are aligned is referred to as the second direction Z, the direction from the first deflection part 351 toward the image light generation device 30 is referred to as Z1, and the direction from the image light generation device 30 toward the first deflection part 351 is referred to as Z2.

As illustrated in FIG. 1, the display device 100 includes the right-eye optical system 10a that causes image light L0a to be incident on a right eye Ea and the left-eye optical system 10b that causes image light L0b to be incident on a left eye Eb. For example, the display device 100 has a glasses-like shape. Specifically, the display device 100 further includes a housing 90 that holds the right-eye optical system 10*a* and the left-eye optical system 10*b*. The display device 100 is worn on the head of the observer by the housing 90.

The display device 100 includes, as the housing 90, a frame 91, a temple 92*a* provided on the right side of the frame 91 so as to be attached to the right ear of the observer, and a temple 92*b* provided on the left side of the frame 91 so as to be attached to the left ear of the observer. The frame 91 includes storage spaces 91*s* on both sides, and optical elements such as the image light generation device 30, a projection optical system 33 and a first diffraction element 50 that constitute the optical system 10 described later are housed in the storage spaces 91*s*. The temples 92*a* and 92*b* are foldably coupled to the frame 91 by hinges 95.

The right-eye optical system 10*a* and the left-eye optical system 10*b* have the same basic configuration. Therefore, the right-eye optical system 10*a* and the left-eye optical system 10*b* are described as the optical system 10 without distinction in the description below.

Figure 7:
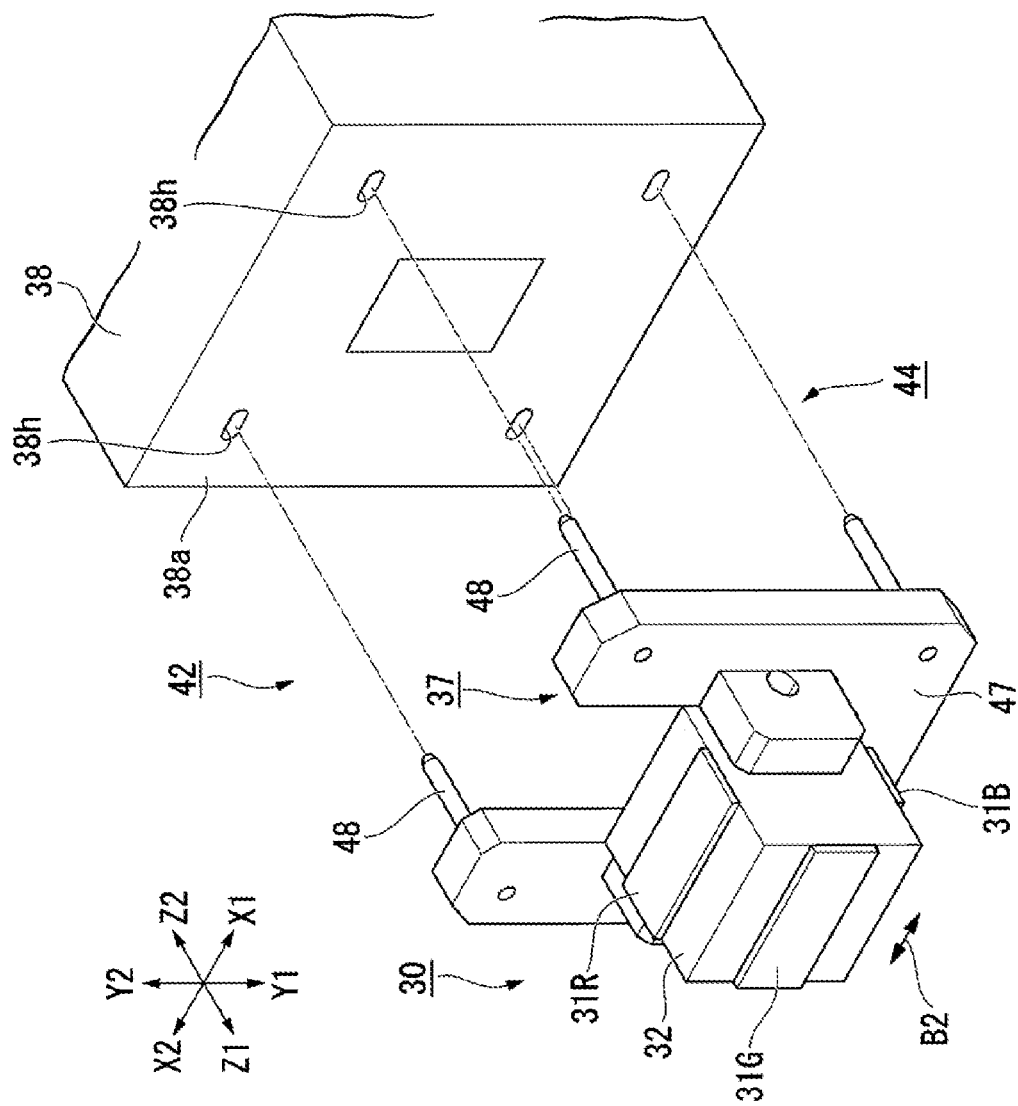
FIG. 7 is a perspective view illustrating a second adjustment mechanism.

As illustrated in FIGS. 2 and 3, in the display device 100 of this embodiment, the optical system 10 includes the image light generation device 30, the projection optical system 33, the first diffraction element 50, a second mirror 60, the second diffraction element 70 (a chromatic aberration correction element), a lens barrel 38 (support member), a first adjustment mechanism 41, and a second adjustment mechanism 42 (see FIG. 7).

The projection optical system 33 includes a lens system 34 and a first mirror 35. The first diffraction element 50 and the second diffraction element 70 are composed of reflection-type volume holograms described later.

In the optical system 10, regarding the traveling direction of image light L0, an image light generation element 31 emits image light L0 toward the projection optical system 33 with a color synthesizing element 32, and the projection optical system 33 emits the incident image light L0 toward the mirror 35. The first mirror 35 deflects the incident image light L0 and emits the image light L0 toward the first diffraction element 50. The first diffraction element 50 emits the image light L0 toward the second diffraction element 70 through the second mirror 60. The second diffraction element 70 emits the incident image light L0 toward the eye E of the observer.

The image light generation device 30 includes a plurality of image light generation elements 31 that emits image light of different colors, the color synthesizing element 32, and a holding member 37 (see FIG. 7). The image light generation element 31 generates the image light L0 having a specific color. The color synthesizing element 32 synthesizes the image light L0 of different colors generated by the plurality of image light generation elements 31. The color synthesizing element 32 is composed of a cross dichroic prism. The image light generation element 31 is composed of a display panel such as an organic electroluminescence display element. The optical system 10 of this embodiment includes the second adjustment mechanism 42 that adjusts the position of the image light generation device 30. The configuration of the second adjustment mechanism 42 will be described later.

The image light generation element 31 may be composed of an illumination light source and a display panel of a liquid crystal display element or the like that modulates illumination light emitted from the illumination light source. In this case, the image light generation element 31 may include one display panel that enables color display. Alternatively, the image light generation device 30 may have a configuration that modulates laser light with a micro-mirror device.

In the following description, a main light beam of the image light L0 that is emitted from a center C of an emission region 31*a* of the image light generation element 31 and impinges on the first mirror 35 is referred to as a center main light beam L11. In addition, an axis that coincides with the optical path of the center main light beam L11 between the image light generation element 31 and the first deflection part 351 is referred to as a first optical axis AX1. An axis that coincides with the optical path of the center main light beam L11 between the first deflection part 351 and the second deflection part 352 after the image light L0 is deflected by the first deflection part 351 is referred to as a second optical axis AX2. An axis that coincides with the optical path of the center main light beam L11 between the second deflection part 352 and the first diffraction element 50 after the image light L0 is deflected by the second deflection part 352 is referred to as a third optical axis AX3.

The first optical axis AX1 and the third optical axis AX3 generally coincide with the second direction Z and are parallel to each other. The second optical axis AX2 generally coincides with the first direction Y and is orthogonal to the first optical axis AX1 and the third optical axis AX3.

The projection optical system 33 includes the lens system 34 on which the image light L0 emitted from the image light generation device 30 impinges, and the first mirror 35 that deflects the image light L0 emitted from the lens system 34 and turns back the optical path. The lens system 34 is composed of a plurality of lenses disposed on the first optical axis AX1.

In this embodiment, the lens system 34 includes a first lens 341, a second lens 342, a third lens 343, and a fourth lens 344 disposed in order from the side closer to the image light generation device 30 on the first optical axis AX1. The first lens 341, the second lens 342, the third lens 343, and the fourth lens 344 are housed inside the lens barrel 38. The lens barrel 38 supports the first lens 341, the second lens 342, the third lens 343, and the fourth lens 344. Each of the first lens 341, the second lens 342, the third lens 343, and the fourth lens 344 is composed of a free-form lens or a spherical lens. The shape and number of the lenses that constitute the lens system 34 may be appropriately changed.

Among the four lenses 341, 342, 343 and 344, each of the third lens 343 and the fourth lens 344 includes an optical surface (free-form surface) that is asymmetric at least in a direction along the first axis (X-axis) of the two axes (X-axis and Y-axis) orthogonal to each other and perpendicular to the optical axis (Z-axis) of the image light L0 emitted from the image light generation device 30. The optical system 10 of this embodiment includes the first adjustment mechanism 41 that adjusts the position of the third lens 343. The configuration of the first adjustment mechanism 41 will be described later.

The third lens 343 of this embodiment corresponds to an optical element of the scope of the claims.

Note that the "optical axis of the image light" is an axis through which a center main light beam of image light emitted from the center of the emission region of the image light generation element passes. In other words, the "optical axis of the image light" is an axis parallel to the normal to the image light emission plane of the image light generation element. In addition, for example, in the case where the image light generation device is composed of a laser light source and a mirror that scans the light from the laser light source, the image light forms an image plane through the scanning, and accordingly the "optical axis of the image light" is an axis that passes through the center of the image plane and is parallel to the normal to the image plane.

As illustrated in FIG. 3, the first mirror 35 includes the first deflection part 351 and the second deflection part 352. Each of the first deflection part 351 and the second deflection part 352 is composed of a total reflection mirror. The first deflection part 351 is disposed at an angle of about 45 degrees to the first axis AX1 and the second optical axis AX2 on the light emission side of the lens system 34 on the first optical axis AX1.

The second deflection part 352 is disposed at an angle of 45 degrees to the second axis AX2 and the third optical axis AX3 on the light emission side of the first deflection part 351 on the second optical axis AX2. In this manner, the first deflection part 351 deflects, to one direction Y1 (lower side) in the first direction Y, the image light L0 emitted from the image light generation element 31. In addition, the second deflection part 352 deflects, to one direction Z1 (rear side) of the second direction Z, the image light L0 deflected by the first deflection part 351.

In this embodiment, the first deflection part 351 and the second deflection part 352 are composed of separate mirrors, but they may be composed of an integrated mirror. In this case, a mirror including a flat reflection surface in a bent shape or a mirror including a curved reflection surface may be adopted. In addition, each of the first deflection part 351 and the second deflection part 352 may be composed of a half mirror. With this configuration, the range in which external light can be visually recognized can be enlarged.

Figure 4:
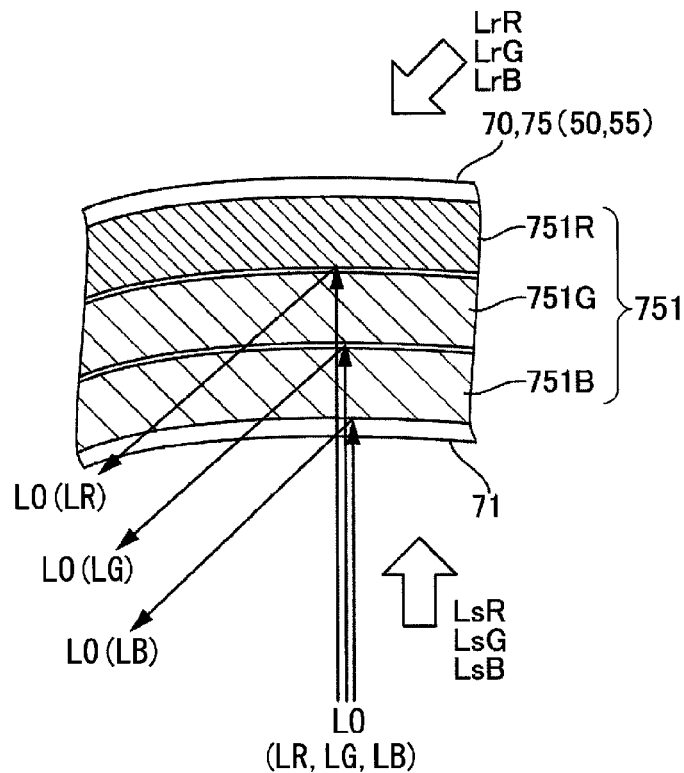
FIG. 4 is an illustrative diagram of interference fringes of a diffraction element.

FIG. 4 is an illustrative diagram of interference fringes 751 of the second diffraction element 70.

As illustrated in FIG. 4, the second diffraction element 70 includes a reflection-type volume hologram 75, and the reflection-type volume hologram 75 is a partial reflection-type diffraction optical element. Thus, the second diffraction element 70 forms a partial transmissive reflective combiner. Therefore, external light enters an eye E of the observer through the second diffraction element 70, and thus the observer can visually recognize an image in which the image light L0 formed by the image light generation element 31 and the external light (background) are superimposed on each other.

The second diffraction element 70 faces the eye E of the observer. An incident surface 71 of the second diffraction element 70 on which the image light L0 impinges has a concave surface that is recessed in a direction away from the eye E. In other words, the incident surface 71 has a shape whose center portion is recessed and curved with respect to the peripheral portion in the incidence direction of the image light L0. Thus, the image light L0 can be efficiently condensed toward the eye E of the observer.

The second diffraction element 70 includes the interference fringes 751 with a pitch corresponding to a specific wavelength. The interference fringes 751 are recorded as a refractive index difference in a hologram photosensitive layer and are inclined in one direction with respect to the incident surface 71 of the second diffraction element 70 so as to correspond to a specific incident angle. Therefore, the second diffraction element 70 deflects the image light L0 by diffracting the image light L0 in a predetermined direction. The specific wavelength and the specific incident angle correspond to the wavelength and the incident angle of the image light L0. The interference fringes 751 can be formed by performing interference exposure on the holographic photosensitive layer with reference light Lr and object light Ls.

In this embodiment, the image light L0 is light for color display. As such, in the second diffraction element 70, the interference fringes 751R, 751G and 751B are each formed at a pitch corresponding to a specific wavelength. For example, the interference fringe 751R is formed at a pitch corresponding to a wavelength of 615 nm, for example, in the wavelength range from 580 nm to 700 nm in the red region. The interference fringe 751G is formed at a pitch corresponding to a wavelength of 535 nm, for example, in the wavelength range from 500 nm to 580 nm in the green region. The interference fringe 751B is formed at a pitch corresponding to a wavelength of 460 nm, for example, in the wavelength range from 400 nm to 500 nm in the blue region.

Since the first diffraction element 50 and the second diffraction element 70 have the same basic configuration, the detailed description of the first diffraction element 50 is omitted. Note that the first diffraction element 50 includes a reflection-type volume hologram 55. In the first diffraction element 50, the incident surface 50a on which the image light L0 impinges is a concave surface having a recessed shape. In other words, the incident surface 50a has a shape whose center portion is recessed and curved with respect to the peripheral portion in the incidence direction of the image light L0. Thus, the image light L0 can be efficiently deflected toward the second mirror 60.

Figure 5:
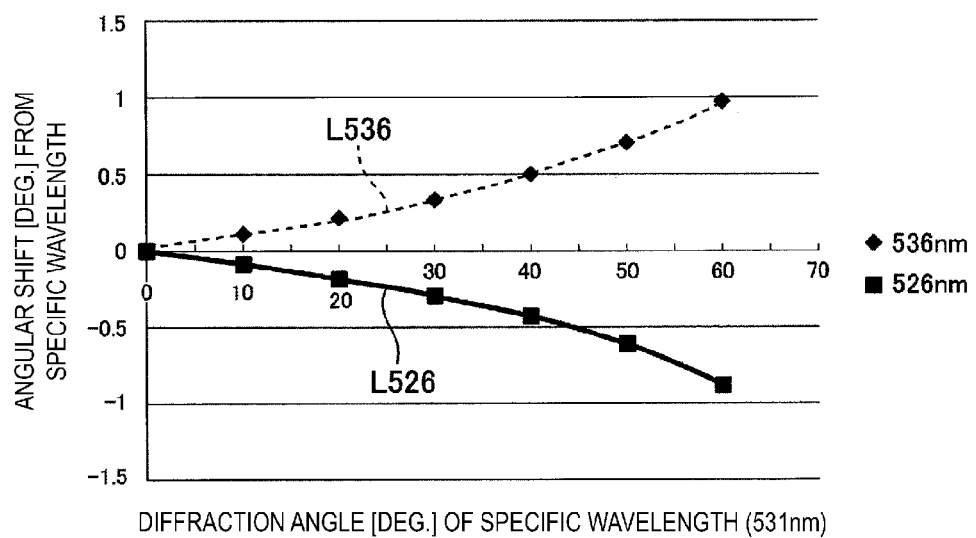
FIG. 5 is an illustrative diagram of diffraction characteristics of a first diffraction element and a second diffraction element.

FIG. 5 is an illustrative diagram of diffraction characteristics of the first diffraction element 50 and the second diffraction element 70. FIG. 5 illustrates a difference in diffraction angle between a specific wavelength and a peripheral wavelength in the case where a light beam is incident on one point on the volume hologram. In FIG. 5, in which the specific wavelength is set to 531 nm, a shift in diffraction angle of light having a peripheral wavelength of 526 nm is indicated by a solid line L526, and a shift in diffraction angle of light having a peripheral wavelength of 536 nm is indicated by a dashed line L536.

As illustrated in FIG. 5, even when the light beams impinge on the same interference fringe recorded in the hologram, the longer wavelength of the light beam, the greater the diffraction. In addition, the shorter the wavelength of the light beam, the smaller the diffraction. Therefore, in the case where two diffraction elements (the first diffraction element 50 and the second diffraction element 70) are used, aberrations cannot be properly compensated unless the incidence angles of light of a longer wavelength and light of a shorter wavelength with respect to a specific wavelength are considered. In addition, since the diffraction angle differs depending on the number of interference fringes, it is necessary to consider the composition of the interference fringes. In the optical system 10 illustrated in FIGS. 2 and 3, the incidence direction to the second diffraction element 70 and the like are optimized in accordance with whether the sum of the number of intermediate image formation between the first diffraction element 50 and the second diffraction element 70 and the number of reflections at the second mirror 60 is an odd or even number, and thus aberrations can be compensated.

The second mirror 60 includes a reflection surface 60a whose center portion is recessed with respect to the peripheral portion. The reflection surface 60a is composed of a spherical surface, an aspherical surface, or a free-form surface. The second mirror 60 reflects the image light L0 emitted from the first diffraction element 50 and emits the light toward the second diffraction element 70. The second mirror 60 is composed of a half mirror. In this manner, the range in which external light can be visually recognized can be enlarged.

As illustrated in FIG. 3, the image light generation device 30, the first lens 341, the second lens 342, the third lens 343 and the fourth lens 344 that constitute the lens system 34, and the first deflection part 351 of the first mirror 35 are disposed at a first height in the first direction Y (up-down direction). In addition, the first diffraction element 50, the second deflection part 352 of the second mirror 35, the second mirror 60, and the second diffraction element 70 are disposed at a second height in the first direction Y (up-down direction). The second height is lower than the first height. In addition, at least a portion of the second diffraction element 70 is disposed inside the lens barrel 38.

In other words, when viewed along the traveling direction of the image light L0 emitted from the image light generation device 30, the image light L0 advances at a constant height until it reaches the first mirror 35 through the lens system 34. After the optical path is bent downward by the first mirror 35, it advances at a substantially constant height at a position lower than before the incidence on the first mirror 35, and then it reaches the second diffraction element 70 through the first diffraction element 50 and the second mirror 60.

The arrangement of the above-described optical elements is expressed using the route of light as follows.

Figure 6:
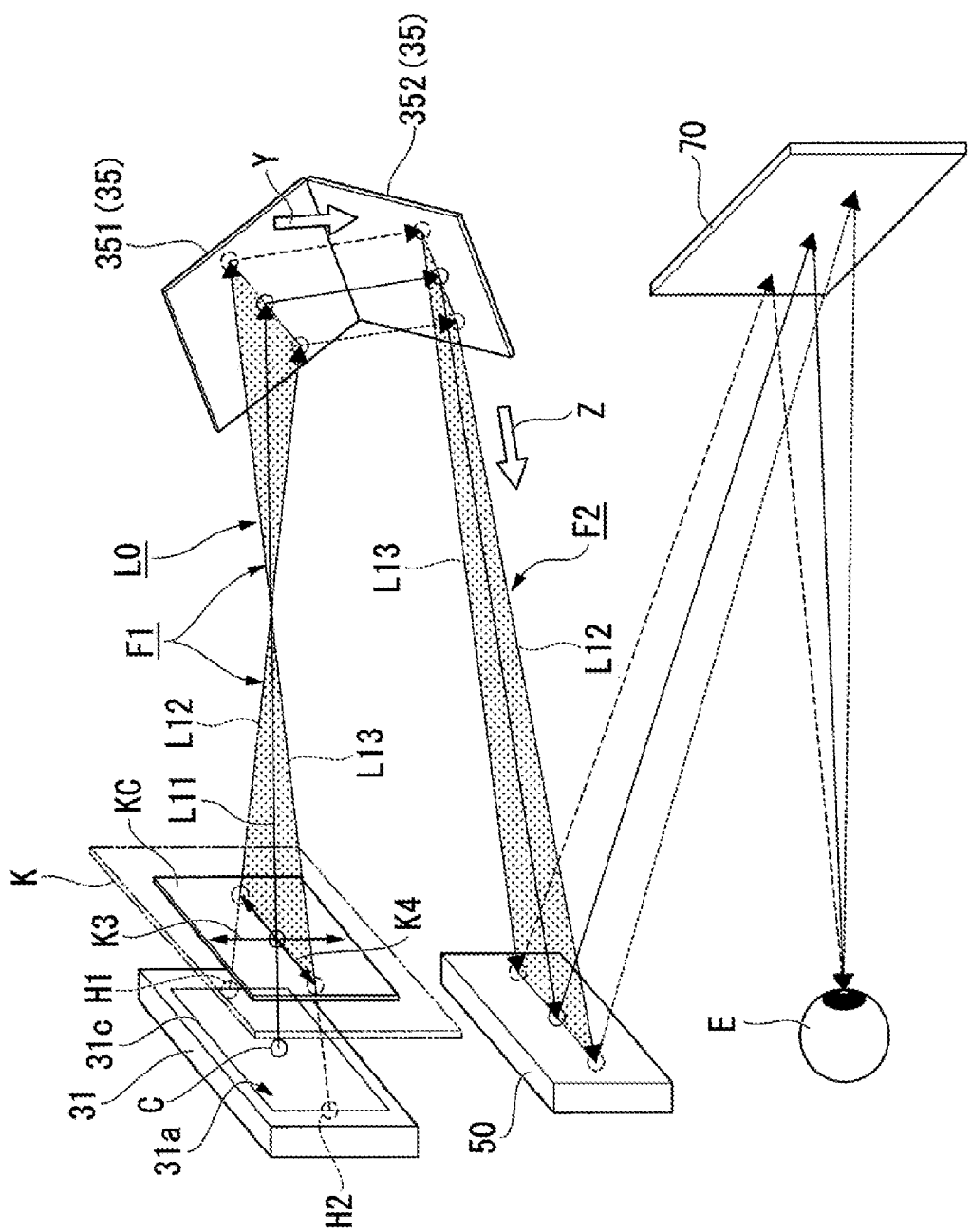
FIG. 6 illustrates an optical path of image light emitted from an image light generation device.

FIG. 6 is a three-dimensional diagram illustrating an optical path of the image light L0 emitted from the image light generation element 31. FIG. 6 illustrates only the image light generation element 31, the first mirror 35, the first diffraction element 50, and the second diffraction element 70 extracted from the components of the display device 100.

As illustrated in FIG. 6, assume a virtual plane K parallel to a display surface 31c of the image light generation element 31 between the image light generation element 31 and the first deflection part 351. In this case, the center main light beam L11 from the image light generation element 31 corresponds to the normal to the virtual plane K located between the image light generation element 31 and the first deflection part 351.

Here, a direction of the first direction Y projected on the virtual plane K is referred to as a third direction K3 of the virtual plane K, and a direction orthogonal to the third direction K3 is referred to as a fourth direction K4. In addition, a plane where the main light beam of the image light L0 emitted from the entire region within the emission region 31a passes through the virtual plane K is referred to as a main light beam passing plane KC. A main light beam passing through a first end H1 in the fourth direction K4 of the main light beam passing plane KC at the center in the third direction K3 of the main light beam passing plane KC is referred to as a first main light beam L12, and a main light beam passing through a second end H2 in the fourth direction K4 of the main light beam passing plane KC at the center in the third direction K3 of the main light beam passing plane KC is referred to as a second main light beam L13.

In addition, a plane surrounded by the main light beam passing plane KC, the first main light beam L12, the second main light beam L13, and the first deflection part 351 is referred to as a first plane F1. A plane surrounded by the second deflection part 352, the first main light beam L12, the second main light beam L13, and the first diffraction element 50 is referred to as a second plane F2. The first plane F1 and the second plane F2 are defined in the above-described manner.

With the above-described definition, in the display device 100 of this embodiment, the first plane F1 overlaps at least a portion of the second first plane F2 when viewed from the third direction K3, and does not overlap the second plane F2 when viewed from the fourth direction K4. Especially in the case of this embodiment, when viewed from the fourth direction K4, the first plane F1 and the second plane F2 are generally parallel to each other.

Roughly speaking, as illustrated in FIG. 2, the image light L0 before incidence on the first mirror 35 after being emitted from the image light generation element 31 and the image light L0 before incidence on the first diffraction element 50 after being folded back by the first mirror 35 at least partially overlap when viewed from the up-down direction (first direction Y). On the other hand, as illustrated in FIG. 3, the image light L0 before incidence on the first mirror 35 after being emitted from the image light generation element 31 and the image light L0 before incidence on the first diffraction element 50 after being folded back by the first mirror 35 do not overlap when viewed from the left-right direction (third direction X).

In the display device 100 of this embodiment, as illustrated in FIGS. 2 and 3, the optical path of the image light L0 from the image light generation element 31 to the second diffraction element 70 is bent in the up-down direction, and various optical elements are disposed in the respective two planes at different heights. In this manner, the area as viewed from the first direction Y (the up-down direction) can be made smaller than that in known configurations, and thus reduction in size of the display device 100 can be achieved.

A configuration of the first adjustment mechanism 41 is described below.

As described above, each of the third lens 343 and the fourth lens 344 includes an optical surface (free-form surface) that is asymmetric at least in the direction along the X axis (first axis) of two axes (X-axis and Y-axis) orthogonal to each other and perpendicular to the optical axis (Z-axis) of the image light L0 emitted from the image light generation device 30. In other words, as illustrated in FIG. 2, the optical surface of the third lens 343 has a shape that is asymmetric in the direction along the X axis when viewed from the direction along the Y axis, but has a shape that is substantially symmetrical in the direction along the Y axis when viewed from the direction along the X axis as illustrated in FIG. 3. Likewise, the optical surface of the fourth lens 344 has a shape that is asymmetric in the direction along the X axis when viewed from the direction along the Y axis as illustrated in FIG. 2, but has a shape that is substantially symmetrical in the direction along the Y axis when viewed from the direction along the X axis as illustrated in FIG. 3.

In the case of this embodiment, the first adjustment mechanism 41 that adjusts the position of the third lens 343 in the direction indicated by the arrow B1, i.e., the direction along the X axis by moving, in the direction along the X axis (first axis), the third lens 343 located closer to the image light generation device 30 of the two lenses 343 and 344 having the optical surfaces that are asymmetric in the direction along the X axis. Note that it is preferable that which of the third lens 343 or the fourth lens 344 to be moved is selected by calculating the optical element having the highest occurrence sensitivity of the eccentric aberration in the entire optical system. In addition, the number of lenses to be moved is not particularly limited, and may be one, or three or more.

The first adjustment mechanism 41 includes an optical element position adjustment mechanism 43 that adjusts the relative position of the third lens 343 with respect to the lens barrel 38. In the case of this embodiment, the optical element position adjustment mechanism 43 includes a spacer 45 provided between the third lens 343 and the inner surface of the lens barrel 38. To correct the eccentric aberration, it suffices to prepare a plurality of the spacers 45 having various thicknesses, and to select the spacer 45 having a thickness with which the eccentric aberration is most small from among the plurality of spacers 45 so as to determine the movement amount of the third lens 343.

Since the lens barrel 38 and the third lens 343 are manufactured with good reproducibility through molding technology or the like, it suffices to determine the thickness of the spacer 45 once for products of the same lot, and thus high yields can be achieved.

As illustrated in FIG. 3, a flat surface 343a is provided in a part of the edge of the third lens 343. After the position adjustment has been performed, the third lens 343 is fixed with an adhesive 46 provided between the flat surface 343a and the inner surface of the lens barrel 38.

A configuration of the second adjustment mechanism 42 is described below.

FIG. 7 is a perspective view illustrating the second adjustment mechanism 42.

As illustrated in FIG. 7, the second adjustment mechanism 42 includes a device position adjustment mechanism 44 that adjusts the relative position of the image light generation device 30 with respect to the third lens 343. The image light generation device 30 includes three image light generation elements, 31R, 31G and 31B, the color synthesizing element 32 provided with image light generation elements 31R, 31G and 31B on respective three incidence surfaces, and the holding member 37 that holds the color synthesizing element 32. When viewed from the emission surface of the color synthesizing element 32, the positions of the three image light generation elements 31R, 31G and 31B are adjusted such that the three color pixels overlap each other, and the image light generation elements 31R, 31G and 31B are fixed to the color synthesizing element 32 with an adhesive.

The holding member 37 includes a substrate 47 and a plurality of pins 48 protruding from one surface of the substrate 47. In a first surface 38a of the lens barrel 38 that faces the image light generation device 30, a plurality of holes 38h through which the plurality of pins 48 of the holding member 37 can be inserted are provided. The outer shape of the pin 48 is a circular shape, while the outer shape of the hole 38h is an elliptical shape with a long axis direction aligned with the X-axis direction. Therefore, when the pins 48 are inserted in the respective holes 38h, there is a margin on the side of each pin 48 in the X-axis direction. Thus, the image light generation device 30 can be moved with respect to the lens barrel 38 in the direction indicated by an arrow B2, i.e., in the X-axis direction. Since the third lens 343 is supported by the lens barrel 38, the position of the image light generation device 30 with respect to the third lens 343 can be adjusted.

When adjusting the position of the optical system 10 in the process of assembling the optical system 10 having the above-described configuration, a first adjustment process of adjusting the position of the third lens 343 in the direction along the X axis is performed, and thereafter, a second adjustment process of adjusting the position of the emission region of the image light in the direction along the X axis by moving the image light generation device 30 in the X axis direction is performed.

In the optical system 10 of the display device 100 having the above-described configuration, the resolution of the image can be increased by correcting the eccentric aberration by moving the third lens 343 having the highest occurrence sensitivity of the eccentric aberration, in the X-axis direction, which is the asymmetric direction of the optical surface. Further, the position of the image within the field of view of the user can be aligned with a desired position by adjusting the position of the emission region of the image light L0 by moving the image light generation device 30 in the X-axis direction as with the movement direction of the third lens 343 with respect to the lens system 34 supported by the lens barrel 38.

Here, since there is low mutual interference between the adjustment of the eccentric aberrations by the third lens 343 and the adjustment of the emission position of the image light by the image light generation device 30, the resolution and the image position can be optimized through a single adjustment following the procedure for adjusting the emission position of the image light L0 after the adjustment of the eccentric aberration is performed first. As a result, it is possible to achieve a head-mounted display that enables visual recognition of an image at a desired position with high resolution and less unpleasantness due to positional shifting.

In the case of the optical system 10 in which the second diffraction element 70 is disposed in the vicinity of the eye and the chromatic aberration is corrected by the first diffraction element 50, the optical path of the image light L0 tends to be long. In this case, slight angular shift of the image light L0 results in large positional shift. In such an optical system 10, by providing the two adjustment mechanisms 41 and 42 for correction of the eccentric aberration and correction of the emission angle, negative effects of eccentric aberration and emission angle errors can be improved. In addition, by using the first diffraction element 50 and the second diffraction element 70 composed of thin hologram elements, a head-mounted display having advantages such as wearing performance, see-through performance and stylish performance can be achieved.

Modification Example

Note that in the above-described embodiment, the optical element position adjustment mechanism 43 may have the following configuration instead of the spacer 45.

Figure 8:
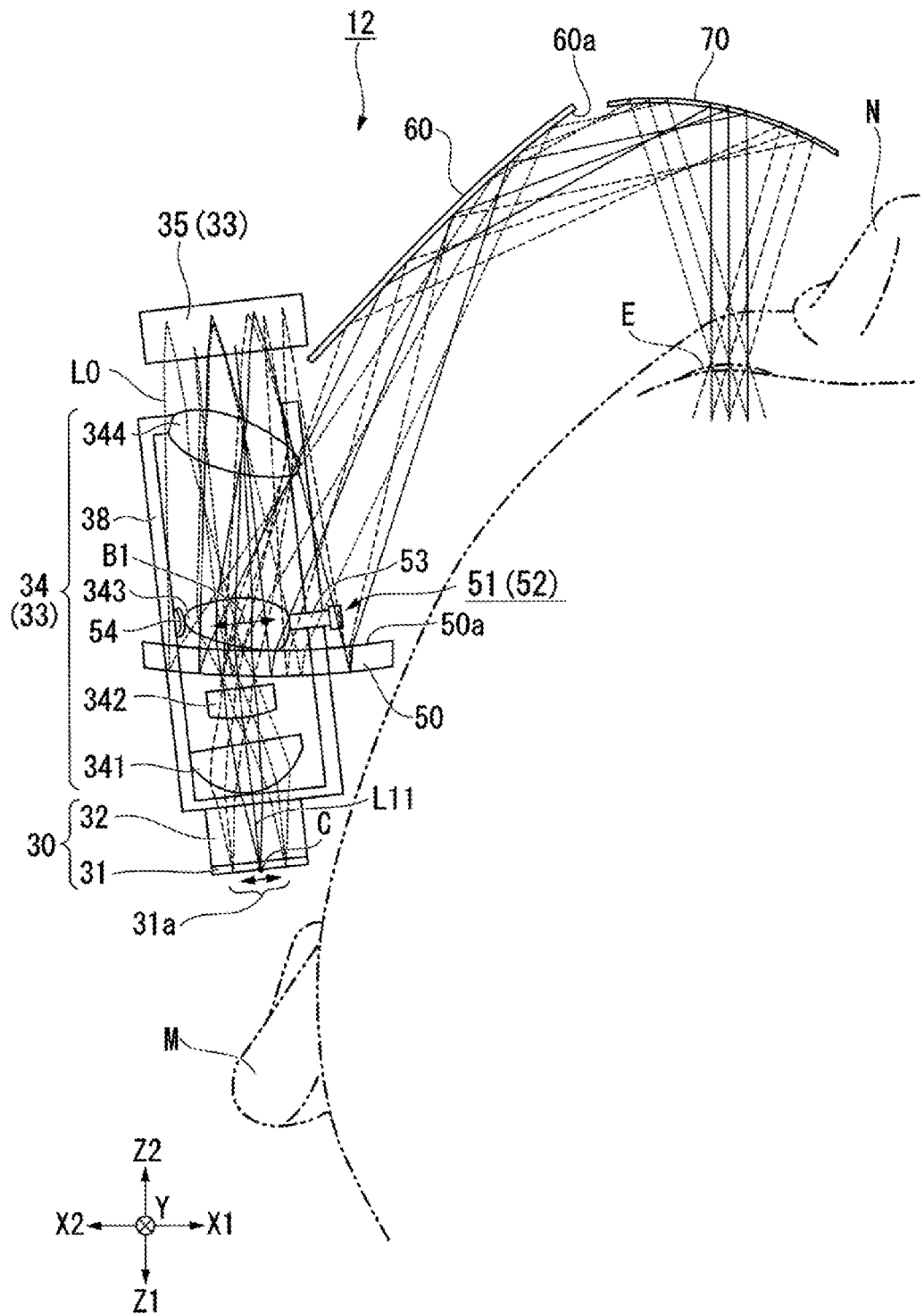
FIG. 8 is a top view illustrating a schematic configuration of an optical system of a modification example.

FIG. 8 is a top view illustrating a schematic configuration of an optical system 12 of a modification example.

In FIG. 8, the components common to those of FIG. 2 are denoted with the same reference signs, and the description thereof will not be omitted.

As illustrated in FIG. 8, in the optical system 12 of the modification example, the first adjustment mechanism 51 includes an optical element position adjustment mechanism 52 that adjusts the relative position of the third lens 343 with respect to the lens barrel 38. The optical element position adjustment mechanism 52 includes a plate spring 54 and a screw 53 (pressing member) for moving the third lens 343 through the lens barrel 38.

The screw 53 penetrates, in the X-axis direction, a hole provided in the lens barrel 38, and a tip thereof is in contact with the third lens 343. In addition, the plate spring 54 is provided at a position where the screw 53 and the leaf spring 54 face each other with the third lens 343 interposed therebetween. With this configuration, the third lens 343 can be moved in the X2 direction along the X axis by rotating the screw 53 so as to press the third lens 343 toward the plate spring 54. In addition, by releasing the pressing force of the third lens 343 by reversing the screw 53, the restorative force of the leaf spring 54 allows the third lens 343 to move in the X1 direction along the X axis.

Second Embodiment

A second embodiment of the present disclosure is described below with reference to FIGS. 9, 10A and 10B.

The basic configuration of a display device of the second embodiment is the same as that of the first embodiment except in configuration of the second adjustment mechanism. Therefore, the description of the entire display device is omitted.

Figure 9:
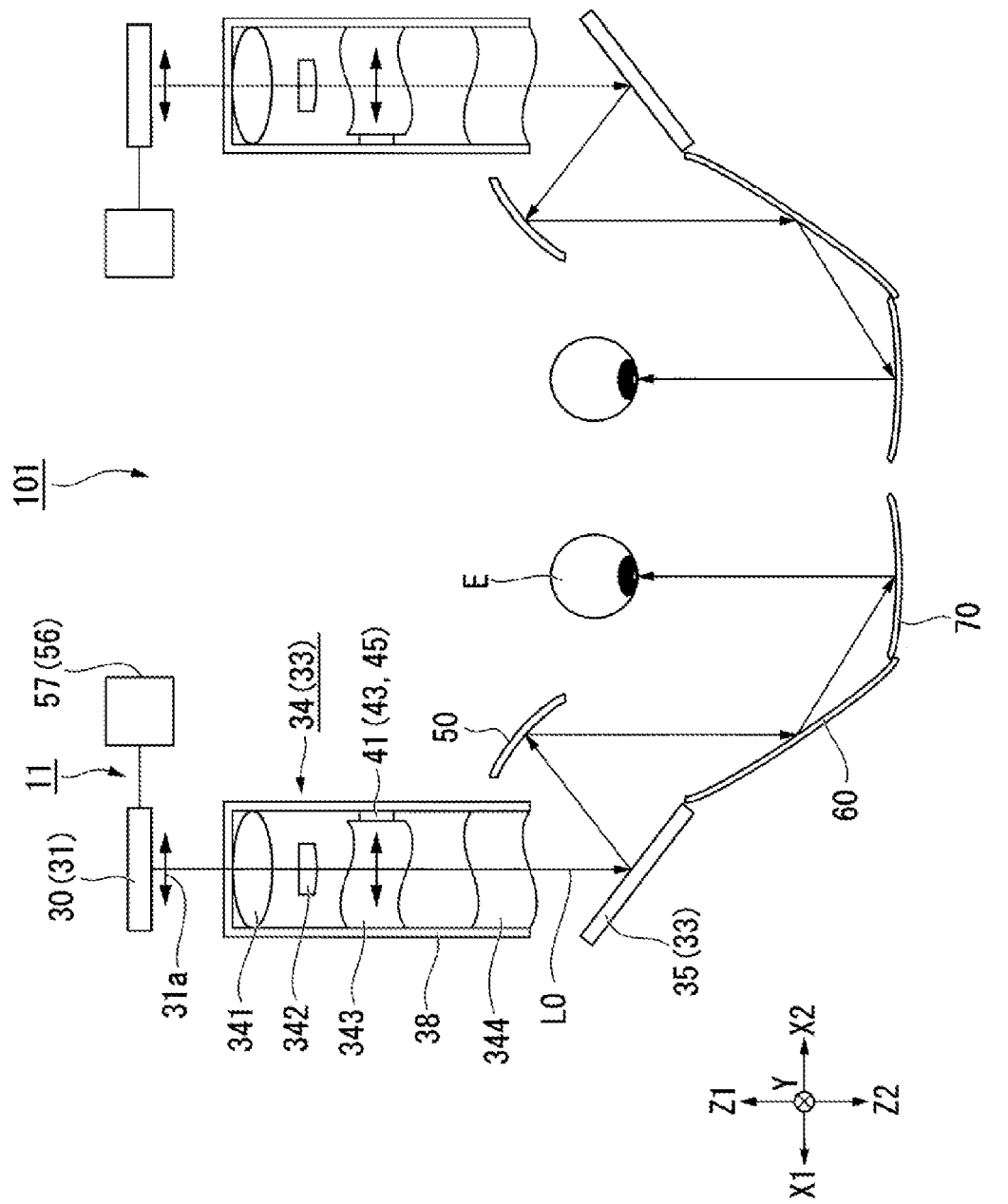
FIG. 9 is a top view illustrating a schematic configuration of an optical system of a display device of a second embodiment.

FIG. 9 is a top view illustrating a schematic configuration of an optical system of a head-wearable display device of the second embodiment. FIG. 10A is a front view of an image display device before adjustment. FIG. 10B is a front view of the image display device after adjustment.

In FIG. 9, the components common to those of the drawings used in the first embodiment are denoted with the same reference signs, and the description thereof is omitted. In addition, in FIG. 9, some optical elements of the optical system are omitted as appropriate for clarity of the drawings.

As illustrated in FIG. 9, in a display device 101 of this embodiment, the optical system 11 includes the image light generation device 30, the projection optical system 33 including the lens system 34, the first diffraction element 50, the second mirror 60, the second diffraction element 70, the lens barrel 38 (support member), the first adjustment mechanism 41, and a second adjustment mechanism 56. The second adjustment mechanism 56 includes an emission position adjustment circuit 57 that adjusts the position of the image light emission region in an image light emission capable region in the image light generation device 30. Specifically, the emission position adjustment circuit 57 is achieved with a CPU that controls the head-wearable display device or the controller, a digital circuit such as an FPGA, and a control circuit such as a driver IC of the image light generation device 30.

Figure 10A:
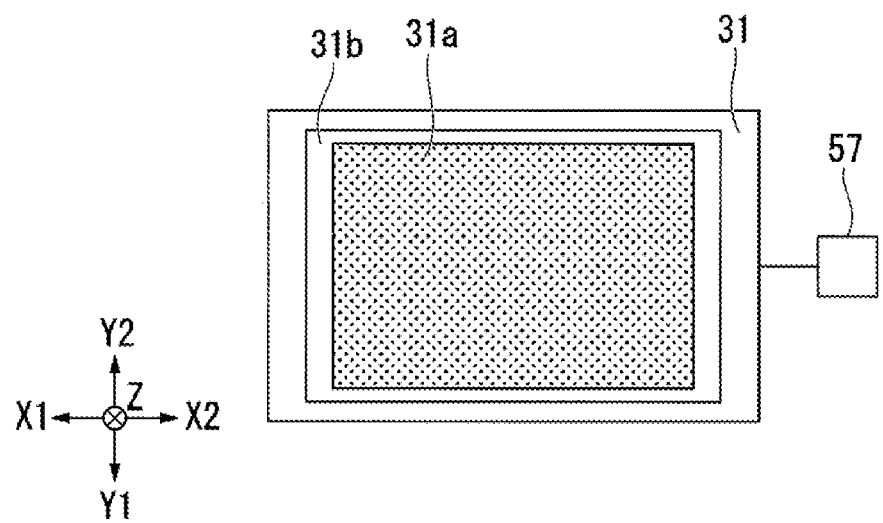
FIG. 10A is a front view of an image display element before adjustment.
Figure 10B:
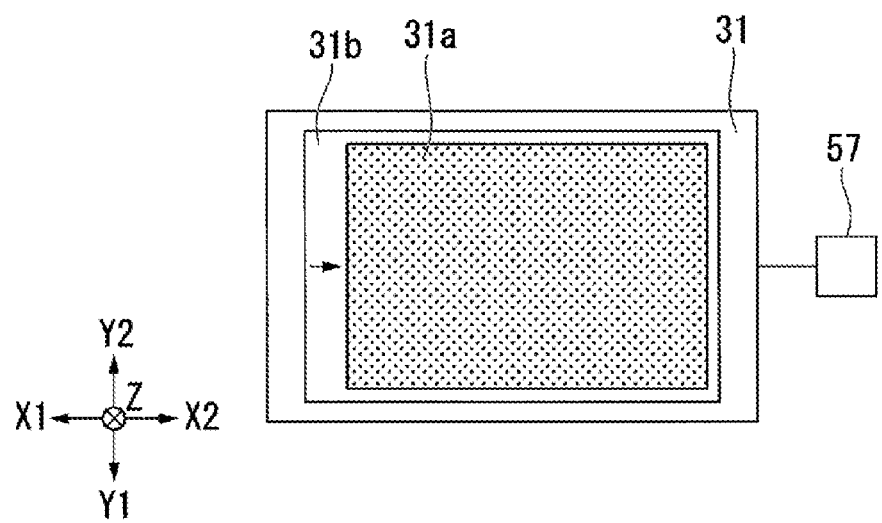
FIG. 10B is a front view of the image display element after adjustment.

As illustrated in FIGS. 10A and 10B, the image light generation element 31 includes an emission capable region 31b of the image light L0. A plurality of pixels is formed in a matrix in the emission capable region 31b. On the other hand, the emission region 31a from which image light L0 is actually emitted is a region narrower than the emission capable region 31b. As such, there is a margin around the emission region 31a in the emission capable region 31b. In the case of this embodiment, the image light generation element 31 may not be configured to be movable.

In the optical system 11 of this embodiment, first, the position in the X-axis direction of the third lens 343 including an optical surface that is asymmetric in the X-axis direction is adjusted such that the resolution of the image is most favorable, as in the first embodiment. Next, by moving the position of the emission region 31a in the X-axis direction with respect to the outer shape of the image light generation element 31, the position is adjusted such that the optical axes of the image light L0 from the two optical systems 11 are at the same angle in both eyes, and that the center of the image is at a predetermined position in the retina of the eye. The movement of the emission region 31a is performed by the emission position adjustment circuit 57. Here, the image light generation element 31 is fixed to the lens barrel 38 in advance.

Also in the optical system 11 of this embodiment, there is little interference between the adjustment of the eccentric aberration by the third lens 343 and the adjustment of the emission position of the image light L0 by the image light generation device 30, and therefore the resolution and the image position can be optimized through a single adjustment following the procedure for adjusting the emission position of the image light L0 after the adjustment of the eccentric aberration is performed first. As a result, the same effect as the first embodiment, i.e., a head-mounted display that enables visual recognition of an image at a desired position with high resolution and less unpleasantness, can be achieved.

In addition, in the case of this embodiment, the image light generation element 31 can be fixed in advance to the lens barrel 38 before the adjustment of the emission position of the image light L0, and therefore the optical system 11 can be easily assembled.

Third Embodiment

A third embodiment of the present disclosure is described below with reference to the FIG. 11.

The basic configuration of a display device of the third embodiment is the same as that of the first embodiment except in configuration of the second adjustment mechanism. Therefore, the description of the entire display device is omitted.

Figure 11:
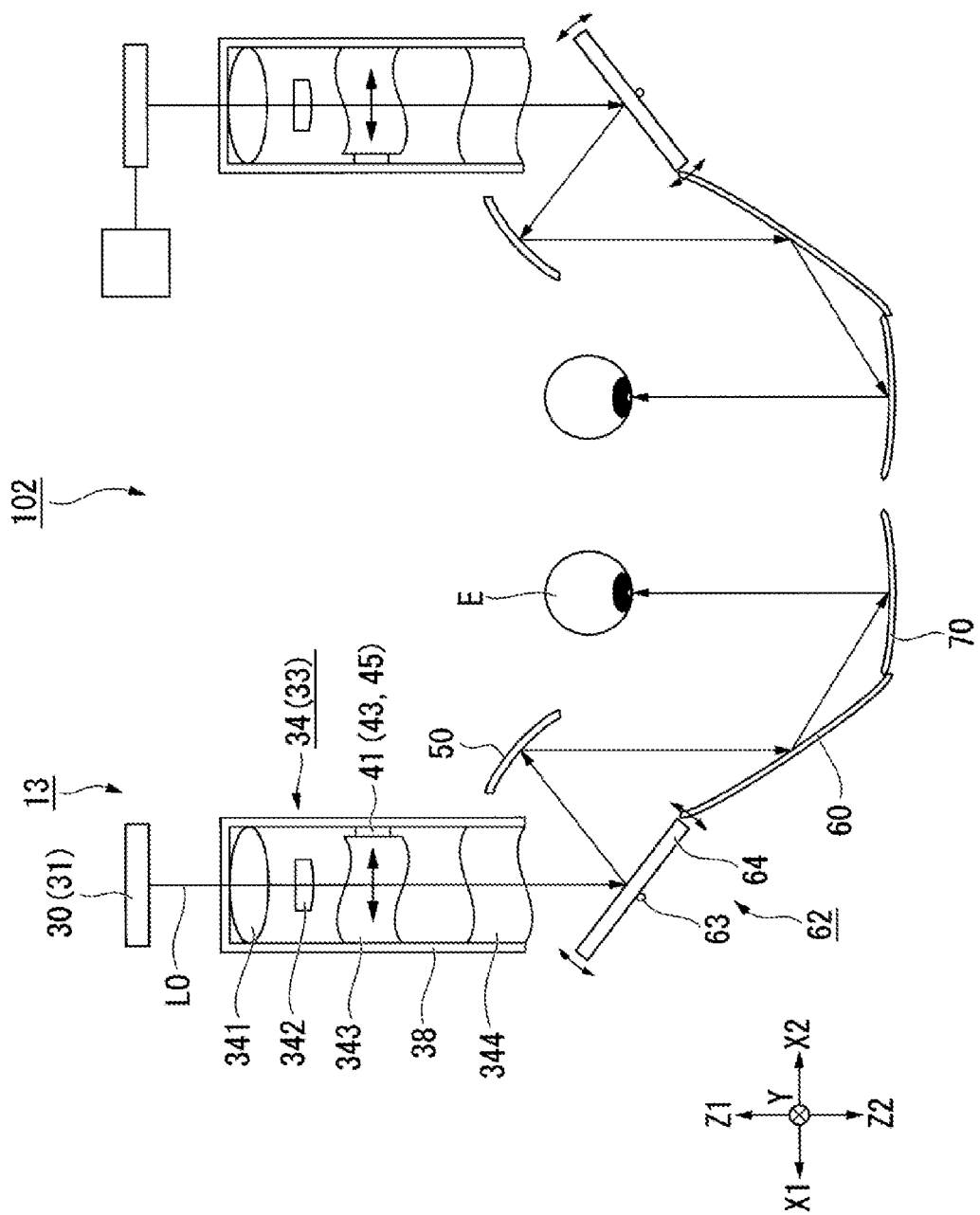
FIG. 11 is a top view illustrating a schematic configuration of an optical system of a display device of a third embodiment.

FIG. 11 is a top view illustrating a schematic configuration of an optical system of a head-wearable display device of the third embodiment.

In FIG. 11, the components common to those of the drawings used in the first embodiment are denoted with the same reference signs, and the description thereof is omitted. In addition, in FIG. 11, some optical elements of the optical system are omitted as appropriate for clarity of the drawings.

As illustrated in FIG. 11, in a display device 102 of this embodiment, the optical system 13 includes the image light generation device 30, the projection optical system 33 including the lens system 34, the first diffraction element 50, the second mirror 60, the second diffraction element 70, the lens barrel 38 (support member), the first adjustment mechanism 41, and a second adjustment mechanism 62. The second adjustment mechanism 62 adjusts the traveling direction of the image light L0 by turning the first mirror 64 (reflection element) around the rotation axis 63 that is parallel to an axis intersecting the optical axis.

The first mirror 64 includes a rotation axis 63 parallel to the Y-axis, and is turnable about the rotation axis 63. Regarding the mirror to be rotated in the optical system 13, it is desirable to rotate the mirror that is close to the lens moved by the first adjustment mechanism 41 and has a nearly flat reflection surface. The reason for this is that the earlier the emission angle of the image light L0 due to lens movement is corrected, the more the positional shift of the image light L0 can be reduced. In addition, the reason is that in the case where the reflection surface of the mirror is nearly flat, new eccentric aberrations due to the rotation of the mirror less occur in comparison with the case where the reflection surface of the mirror is a curved surface with a large curvature.

In the optical system 13 of this embodiment, first, the position in the X-axis direction of the third lens 343 including an optical surface that is asymmetric in the X-axis direction is adjusted such that the resolution of the image is most favorable, as in the first embodiment. Next, by turning the first mirror 64, the shift in the optical axis of the image light L0 due to movement in the X-axis direction of the third lens 343 is corrected. In other words, when adjusting the position of the optical component in the process of assembling the optical system 13 having the above-described configuration, a first adjustment process of adjusting the position of the third lens 343 in the direction along the X axis is performed, and thereafter, a second adjustment process of turning the first mirror 64 to adjust the traveling direction of the image light L0 in the direction along the X axis is performed.

Also in the optical system 13 of this embodiment, there is little mutual interference between the adjustment of the eccentric aberration by the third lens 343 and the adjustment of the traveling direction of the image light L0 by the turning of the first mirror 64, and therefore the resolution and the image position can be optimized through a single adjustment following the procedure for adjusting the position of the image light L0 after the adjustment of the eccentric aberration is performed first. As a result, the same effect as the first embodiment, i.e., a head-mounted display that enables visual recognition of an image at a desired position with high resolution and less unpleasantness, can be achieved.

In addition, in the case of this embodiment, since the emission position of the image light L0 is set through rotation of the first mirror 64, the adjustment operation can be simply performed.

Fourth Embodiment

A fourth embodiment of the present disclosure is described below with reference to FIG. 12.

In the fourth embodiment, an example is described in which the optical system of the above-described embodiment is applied to a display device including a light guide.

Figure 12:
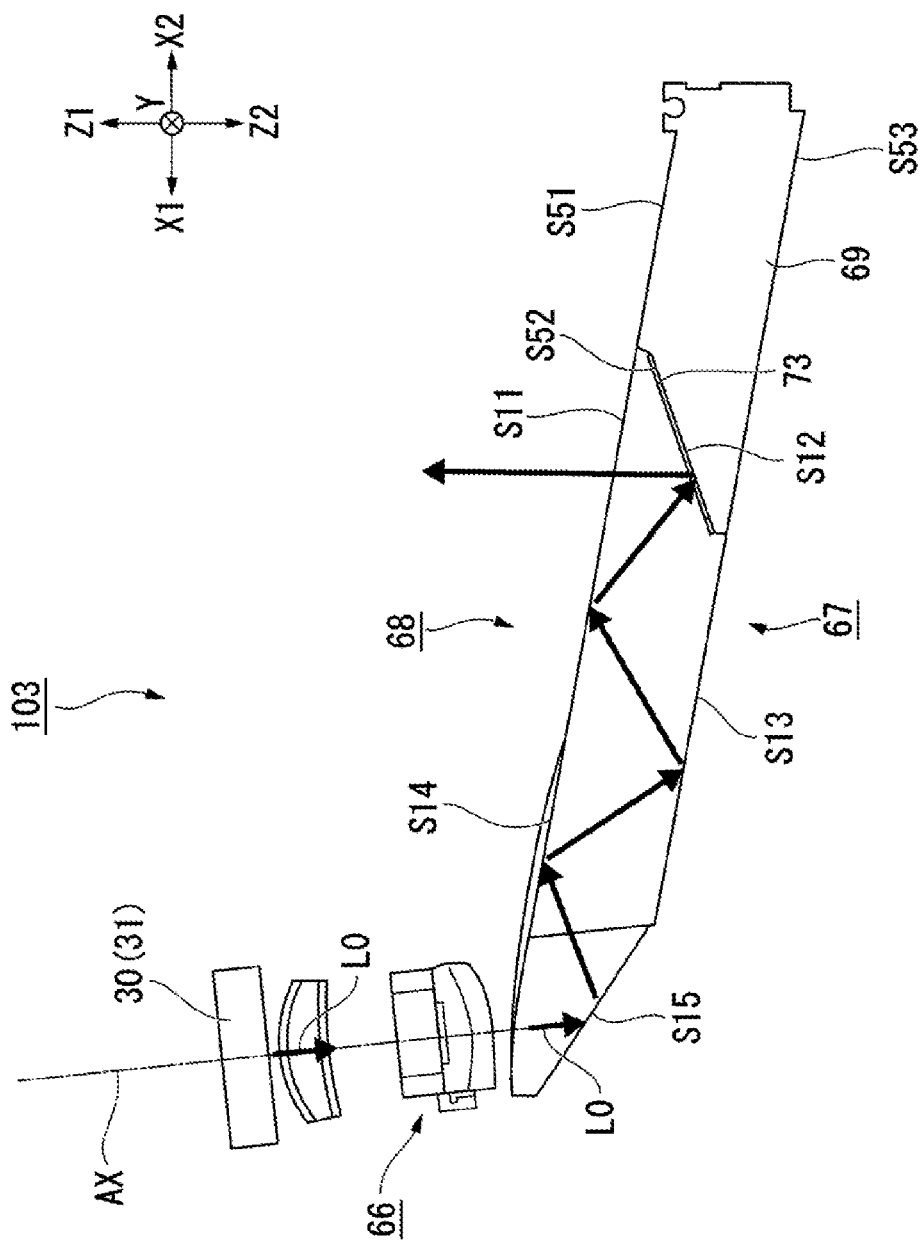
FIG. 12 is a schematic configuration diagram illustrating a display device of a fourth embodiment.

FIG. 12 is a schematic configuration diagram illustrating a display device 103 of the fourth embodiment.

As illustrated in FIG. 12, the display device 103 includes the image light generation device 30 that generates the image light L0, a projection optical system 66 for image formation that is housed in a lens barrel (not illustrated), and a light guide device 67 that guides image light that has passed through the image light generation device 30 and the projection optical system 66. The light guide device 67 is composed of a light guide member 68 for light guidance and see-through viewing, and a light transmission member 69 for see-through viewing.

The image light generation device 30 is composed of the image light generation element 31 composed of a self-emitting element such as organic EL, for example. In addition, the image light generation device 30 may include, for example, a backlight (not illustrated) that emits illumination light to the image display element, a drive control part (not illustrated) that controls the operation and the like, in addition to a transmission type spatial light modulator.

The projection optical system 66 includes a plurality of optical elements (lenses) disposed along the direction (Z axis direction) in which an optical axis AX extends. In the projection optical system 66, these optical components (optical elements or lenses) are housed in a lens barrel. Note that, when the optical element is composed of an aspherical lens including both an axially non-symmetric aspherical surface (non-axisymmetric aspherical surface) and an axially symmetric aspherical surface (axisymmetric aspherical surface), for example, the optical element can form an intermediate image corresponding to the display image inside the light guide member 68 in cooperation with a portion of the light guide member 68 that constitutes the light guide device 67. The projection optical system 66 projects, toward the light guide device 67, the image light L0 formed by the image light generation device 30.

The light guide device 67 includes the light guide member 68 for light guidance and see-through viewing, and the light transmission member 69 for see-through viewing. The light transmission member 69 is a member that assists the see-through viewing function of the light guide member 68. The light transmission member 69 is integrally fixed with the light guide member 68, and constitutes one light guide device 67. The light guide device 67 is fixed to a holding member (not illustrated), for example, and is thus precisely positioned with respect to the projection optical system 66.

The light guide member 68 includes a first surface S11 to a fifth surface S15 as side surfaces having an optical function. Among them, the first surface S11 and the fourth surface S14 are continuously adjacent to each other, and the third surface S13 and the fifth surface S15 are continuously adjacent to each other. In addition, the second surface S12 is disposed between the first surface S11 and the third surface S13. A half mirror 73 is provided at a surface of the second surface S12. The half mirror 73 is a reflection film having light transmissivity, i.e., a semi-transmission reflection film composed of a metallic reflection film, a dielectric multi-layer film or the like, and is appropriately provided with a reflectivity with respect to the image light L0.

The light transmission member 69 includes a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is located in a plane extended from the first surface S11 of the light guide member 68. The second transmission surface S52 is a curved surface that is joined to and integrated with the second surface S12. The third transmission surface S53 is located in a plane extended from the third surface S13 of the light guide member 68.

The image light L0 formed by the image light generation device 30 is projected toward the light guide device 67 by the projection optical system 66. The light guide member 68 of the light guide device 67 allows incidence of the image light L0 from the projection optical system 66, and guides the image light L0 toward the eye of the observer through reflection at the first surface S11 to the fifth surface S15 and the like. Specifically, the image light L0 from the projection optical system 66 first impinges on the fourth surface S14 so as to be reflected by the fifth face S15, again impinges on the fourth surface S14 from the inner side so as to be totally reflected, impinges on the third surface S13 so as to be totally reflected, and then impinges on the first surface S11 so as to be totally reflected. The image light L0 totally reflected by the first surface S11 impinges on the second surface S12 so as to partially pass through the half mirror 73 provided in the second surface S12 while being partially reflected by the half mirror 73, and then again impinges on the first surface S11 and passes through the first surface S11. The image light L0 passed through the first surface S11 impinges on the eye of the observer or an equivalent position, as a substantially parallel luminous flux. In other words, the observer observes the image with the image light as the virtual image.

In the light guide member 68 of the light guide device 67, the third surface S13 and the first surface S11 are flat surfaces that are substantially parallel to each other, and the third transmission surface S53 and the first transmission surface S51 are flat surfaces that are substantially parallel to each other. As a result, aberration with respect to the extraneous light or the like does not occur. Further, since the third transmission surface S53 and the first surface S11 are flat surfaces that are substantially parallel to each other, almost no aberration or the like occurs with respect to the extraneous light. Thus, the observer can observe an extraneous image with no distortion.

Also, in the display device 103 of this embodiment, with a first adjustment mechanism that moves a lens having an asymmetric optical surface of the projection optical system 66, for example, and a second adjustment mechanism that moves the image light generation device 30, the resolution adjustment and the image position adjustment can be appropriately performed.

Note that the technical scope of the present disclosure is not limited to the above-described embodiments, and various modifications may be made without departing from the spirit and gist of the present disclosure.

For example, while the spacer and the screw are exemplified as the first adjustment mechanism that adjusts the position of the optical element in the embodiment, it is possible to adopt a space, a notch, a protrusion or the like required for a support member to move an optical element, for example.

In addition, while an exemplary case in which the spacer and the screw constituting the first adjustment mechanism are present after adjustment is described in the embodiment, it is possible to adopt a configuration in which the first adjustment mechanism of this type is removed after adjustment, for example. For example, even in the state where the spacer and the screw are removed after adjustment, a wider gap is provided between the lens and the lens barrel whose positions have been adjusted than between the lens and the lens barrel whose positions have not been adjusted. In such a case, the wide gap can be regarded as an adjustment space of the position of the optical element, and it can be taken as the first adjustment mechanism.

The optical element that is moved by the first adjustment mechanism is not necessarily limited to a lens, and may be a mirror. In addition, in the third embodiment, the mirror to be turned may be a flat mirror, a free-form mirror, or a hologram element constituting the first diffraction element.

The image light generation device may be, for example, a transmissive liquid crystal display, a reflective liquid crystal display, an organic EL panel, a micro LED panel, a DMD, or the like. The display may be a single display including three color pixels, a monochrome display that is synthesized by a color synthesizing element, or may be a color sequential (time division) display.

In addition, the specific description of the shape, number, arrangement, material, and the like of each component of the display device is not limited to the embodiments, and may be changed as appropriate.

What is claimed is:

1. A display device comprising an optical system, the optical system including:
    an image light generation device configured to generate image light;
    a projection optical system including an optical element, the optical element being a single lens and including an optical surface asymmetric in a direction along at least a first axis of two axes orthogonal to each other and perpendicular to an optical axis of the image light;
    a support member configured to support the optical element;
    a first adjustment mechanism configured to adjust a position of the optical element in the direction along the first axis, and being in contact with the optical element and an inner surface of the support member; and
    a second adjustment mechanism configured to adjust a position of an emission region of the image light in the direction along the first axis, and disposed outside the support member.

2. The display device according to claim 1, wherein the second adjustment mechanism includes a device position adjustment mechanism configured to adjust a relative position of the image light generation device with respect to the optical element.

3. The display device according to claim 1, wherein the second adjustment mechanism includes an emission position adjustment circuit configured to adjust a position of an image light emission region in an image light emittable region in the image light generation device.

4. The display device according to claim 1, wherein the first adjustment mechanism includes an optical element position adjustment mechanism configured to adjust a relative position of the optical element with respect to the support member.

5. The display device according to claim 4, wherein the optical element position adjustment mechanism includes a spacer provided between the optical element and the support member.

6. The display device according to claim 4, wherein the optical element position adjustment mechanism includes a pressing member configured to move the optical element through the support member.

7. The display device according to claim 1, wherein the optical system further includes a first diffraction element configured to guide the image light to an eye of an observer, and a chromatic aberration correction element configured to correct a chromatic aberration generated at the first diffraction element.

8. The display device according to claim 7, wherein the chromatic aberration correction element is a second diffraction element configured to guide the image light to the first diffraction element.

9. The display device according to claim 8, wherein at least a portion of the second diffraction element is disposed inside the support member.

10. The display device according to claim 1, comprising a pair of the optical systems, wherein
    the pair of the optical systems are constituted of a right-eye optical system configured to guide the image light to a right eye of an observer, and a left-eye optical system configured to guide the image light to a left eye of the observer.

11. A method of adjusting an optical system of a display device, the optical system including:
    an image light generation device configured to generate image light;
    a projection optical system including an optical element, the optical element being a single lens and including an optical surface asymmetric in a direction along at least a first axis of two axes orthogonal to each other and perpendicular to an optical axis of the image light;
    a support member configured to support the optical element;
    a first adjustment mechanism being in contact with the optical element and an inner surface of the support member; and
    a second adjustment mechanism disposed outside the support member, the method comprising:
    a first adjusting step of adjusting a position of the optical element in the direction along the first axis through the first adjustment mechanism; and
    a second adjusting step of adjusting, after the first adjusting step, a position of an emission region of the image light in the direction along the first axis through the second adjustment mechanism.

* * * * *